(12) United States Patent
Sakayama et al.

(10) Patent No.: US 6,333,380 B1
(45) Date of Patent: Dec. 25, 2001

(54) THERMOSETTING RESIN COMPOSITION FOR POWDER PAINT AND THERMOSETTING POWDER PAINT COMPOSITION USING THE SAME

(75) Inventors: Hiroyuki Sakayama; Yoshio Kikuta; Mitsuyuki Mizoguchi; Takahisa Miyawaki; Tsuyoshi Matsumoto, all of Kanagawa (JP)

(73) Assignee: Mitsui Chemicals, Inc. (JP)

( * ) Notice: Subject to any disclaimer, the term of this patent is extended or adjusted under 35 U.S.C. 154(b) by 0 days.

(21) Appl. No.: 09/495,895

(22) Filed: Feb. 2, 2000

(30) Foreign Application Priority Data

Feb. 8, 1999 (JP) .................................................. 11-029445

(51) Int. Cl.$^7$ ........................ C08G 63/48; C08F 283/04; C08F 118/02
(52) U.S. Cl. .......................... 525/10; 525/424; 525/425; 525/437; 525/444; 526/317.1; 526/319
(58) Field of Search .............................. 525/10, 424, 425, 525/437, 444; 526/317.1, 319

(56) References Cited

U.S. PATENT DOCUMENTS

| | | |
|---|---|---|
| 3,954,898 | 5/1976 | Hirota et al. . |
| 4,089,910 | * 5/1978 | Shibata et al. ........................ 525/450 |
| 5,212,245 | 5/1993 | Franks et al. . |
| 5,523,349 | 6/1996 | Shiomi et al. . |
| 5,648,117 | 7/1997 | Shiomi et al. . |
| 6,008,301 | * 12/1999 | Miyawaki et al. .................... 525/386 |

FOREIGN PATENT DOCUMENTS

| | | |
|---|---|---|
| 0773268 | 5/1997 | (EP) . |
| 57049672A | 3/1982 | (JP) . |
| 07179789A | 7/1995 | (JP) . |
| 08209034A | 8/1996 | (JP) . |
| WO95/15347 | 6/1995 | (WO) . |
| WO 9529963 | 11/1995 | (WO) . |
| WO 9605260 | 2/1996 | (WO) . |
| WO97/30131 | 8/1997 | (WO) . |

* cited by examiner

Primary Examiner—James J. Seidleck
Assistant Examiner—Olga Asinovsky
(74) Attorney, Agent, or Firm—Burns, Doane, Swecker & Mathis, L.L.P.

(57) ABSTRACT

There are disclosed a thermosetting resin composition for a powder paint in which a resin composition component (A) is a (block) copolymer obtained by allowing a vinyl-based polymer G (branch) block (component (a-1)) to graft-react with a vinyl-based polymer S (back bone) block (component (a-2)), and if the solubility parameters of the components (a-1) and (a-2) are represented by $SP_G$ and $SP_G$, respectively, $SP_G$ and $SP_S$ satisfy the following numerical formula (I), and a thermosetting powder paint composition comprising a resin composition component (A) and a hardener composition component (B) wherein the component (A) is said thermosetting resin composition for a powder paint. By these compositions, a thermosetting powder paint composition having excellent storage stabilities, appearance properties, physical properties and chemical properties can be provided. Particularly, there can be provided a thermosetting powder paint composition suitably applied to painting of bodies of vehicles such as automobiles and parts of vehicles such as automobiles (aluminum wheel, wiper, pillar, door handle, fender, bonnet, air spoiler, stabilizer, front grill and the like), particularly, to top painting.

$$SP_G < SP_S \tag{I}$$

13 Claims, No Drawings

THERMOSETTING RESIN COMPOSITION FOR POWDER PAINT AND THERMOSETTING POWDER PAINT COMPOSITION USING THE SAME

BACKGROUND OF THE INVENTION (1) Field of the Invention

The present invention relates to a thermosetting resin composition for a powder paint and a thermosetting powder paint composition using the same. More particularly, the present invention relates to a thermosetting powder paint composition which has excellent storage stabilites (blocking property and the like), appearance properties (cissing, smoothness, sharpness and the like), physical properties (hardness, scratch-resistance and the like) and chemical properties (weather-resistance, acid-resistance, solvent-resistance and the like) and particularly can provide a baked paint film suitable for vehicle painting use.

(2) Description of the Prior Art

Conventionally, solvent type paints are used for painting articles, and paints satisfying various requirements for use in fields such as automobiles and the like in which strict qualities are required have been developed and used.

Recently, in the technical field of paints, change from solvent type paints to powder type paints (hereinafter, referred to as powder paint) has been expected from the standpoints of local or global environmental protection (VOC (volatile organic compound) restriction), labor safety hygiene environment improvement, fire and explosion protection, resources saving and the like.

Along increase in expectation of high ability and variety of powder paints owing to historical or social requirements, powder paints have also been required to reveal high-grade paint film abilities (e.g., weather-resistance, acid rain-resistance, scratch-resistance and the like) corresponding to those of solvent type paints. However, irrespective of increased strictness of paint film abilities required for powder paints, it is not necessarily admitted that powder pants completely satisfying these requirements have been available commercially. Specific examples of conventional type powder paints include epoxy resin powder paints and polyester resin powder paints. However, these paints had problems not only in weather-resistance but also in resistance to acid rain which has been recently regarded as problematical, and had problems in the field of automobile body painting and the like.

For improving these defects, U.S. Pat. No. 3,954,898 (Japanese Patent Application Publication (JP-B) No. 48-38617) suggested an acrylic powder paint and remarkable improvement in weather-resistance was realized. Thereafter, a lot of studies have been made regarding acrylic powder paints. However, these acrylic powder paints did not fully satisfy simultaneously appearance properties, physical properties, chemical properties and storage stabilities, particularly, smoothness and blocking property. For improving smoothness, it is most effective to decrease the melt viscosity. However, the glass transition temperature should be lowered to decrease the melt viscosity, and in this method, satisfying both smoothness and blocking property was impossible.

Then, there has been suggested a resin composition which has improved smoothness by mixing a thermosetting resin having high melt viscosity and high glass transition temperature with a thermosetting resin having low melt viscosity and low glass transition temperature, the latter resin having different solubility parameter from that of the former resin (Japanese Patent Application Laid-Open (JP-A) No. 8-209034). However, this resin composition revealed reduced appearance properties (cissing, smoothness) and storage stability (blocking property) and the like due to dispersion failure and localization phenomenon during storage, and did not manifest satisfactory effects, since resins having different solubility parameters were physically mixed.

Usually, a flow controlling agent is used in an acrylic powder paint for the purpose of improving smoothness and preventing cissing (cratering, fish eye). Paints or resin composition in which appearance properties, physical properties and chemical properties are improved by a flow controlling agent have been suggested (JP-A No. 57-49672, U.S. Pat. Nos. 5,523,349, 5,648,117 (JP-A No. 7-179789) and the like). However, these resin compositions also revealed reduced appearance properties (cissing, smoothness) and storage stability (blocking property) and the like due to dispersion failure and localization phenomenon during storage, and did not manifest satisfactory effects, since a flow controlling agent was only physically mixed by a melt kneading method and the like.

Further, there have been suggested compositions in which a reactive functional group such as an amino group, carboxyl group, hydroxyl group, epoxy group and the like is contained, as a reactive flow controlling agent, in the molecule and this agent is reacted with a main component or curing agent component in forming a paint film to improve paint film properties (U.S. Pat. No. 5,212,245 (JP-A No. 8-325480), WO 97/30131 (Japanese Kohyo Patent Publication 11-506156) and the like). However, this reaction is only a reaction in forming a paint film, and there is almost no reaction in the paint composition and improvement in dispersibility of a flow controlling agent owing to the reaction is not considered. Therefore, these flow controlling agents also provided reduced appearance properties (cissing, smoothness) and storage stability (blocking property) and the like due to dispersion failure and localization phenomenon during storage, and did not accomplish satisfactory effects, similar to the flow controlling agents of the conventional type.

Furthermore, there has been suggested powder paints in which appearance property (smoothness) is improved by allowing a silicon component as a G (branch) block to graft-react with an acrylic vinyl copolymer component as a S (back bone) block as a technology for grafting a G (branch) block to a S (back bone) block (WO 95-15347 (Japanese Kohyo Patent Publication 9-505847) and the like). This technology is apparently different from the instant application in which a G (back bone) block is a silicon component and a G (branch) block is a vinyl-based polymer, and particularly, preferably an acrylic vinyl polymer. Further, this powder paint had a problem in re-coating property since the silicon component reduces excessively the critical surface tension of the paint film surface layer.

SUMMARY OF THE INVENTION

The present invention provides a thermosetting powder paint composition (for example, an acrylic thermosetting powder paint composition) having excellent storage stabilities, appearance properties, physical properties and chemical properties, in view of the above-described problems of the conventional technologies. Particularly, the present invention provides a thermosetting powder paint composition (for example, an acrylic thermosetting powder paint composition) suitably applied to painting of bodies of vehicles such as automobiles and parts of vehicles such as automobiles (aluminum wheel, wiper, pillar, door handle, fender, bonnet, air spoiler, stabilizer, front grill and the like), particularly, to top painting.

The present inventors have intensively studied for solving the above-described problems of the prior arts, and found that by grafting a component (a-1) to a component (a-2), the dispersibility of the component (a-1) can be remarkably improved and additionally localization phenomenon during storage can be prevented, to provide a thermosetting powder paint composition (for example, an acrylic thermosetting powder paint composition) having excellent storage stabilities, appearance properties, physical properties and chemical properties, and found a thermosetting resin composition for a powder paint which is used in the paint composition, completing the present invention.

The present invention is specified by the following subjects [1] to [21].

[1] A thermosetting resin composition for a powder paint in which a resin composition component (A) is a (block) copolymer obtained by allowing a vinyl-based polymer G (branch) block (component (a-1)) to graft-react with a vinyl-based polymer S (back bone) block (component (a-2)), and when the solubility parameters of the components (a-1) and (a-2) are represented by $SP_G$ and $SP_S$, respectively, $SP_G$ and $SP_S$ satisfy the following numerical formula (I):

$$SP_G < SP_S \quad (I)$$

[2] The thermosetting resin composition for a powder paint according to [1] wherein when the weights of the above described components (a-1) and (a-2) are represented by $M_G$ and $M_S$, respectively, $M_G$ and $M_S$ satisfy the following numerical formula (II):

$$M_S \times 10^{-4} \leq M_G \leq M_S \times 10^{-1} \quad (II)$$

[3] The thermosetting resin composition for a powder paint according to [1] or [2] wherein the vinyl-based polymer of the component (a-1) and/or the vinyl-based polymer of the component (a-2) comprises a (meth)acrylic vinyl polymer.

[4] The thermosetting resin composition for a powder paint according to any of [1] to [3] wherein the vinyl-based polymer of the component (a-1) and/or the vinyl-based polymer of the component (a-2) is composed solely of a (meth)acrylic vinyl polymer.

[5] The thermosetting resin composition for a powder paint according to any of [1] to [4] wherein the above described components (a-1) is a vinyl-based polymer having a solubility parameter of 10.0 or less.

[6] The thermosetting resin composition for a powder paint according to any of [1] to [5] wherein the above described components (a-1) comprises (a-1-1) a vinyl-based polymer containing in one molecule at least one radical-polymerizable unsaturated double bond and/or (a-1-2) a vinyl-based polymer containing in one molecule at least one non-radical-polymerizable functional group having reactivity with the above described component (a-2).

[7] The thermosetting resin composition for a powder paint according to any of [1] to [6] wherein the non-radical-polymerizable functional group of the component (a-1-2) is at least one group selected from a carboxyl group, acid anhydride group and amino group.

[8] The thermosetting resin composition for a powder paint according to any of [1] to [7] wherein the above described components (a-2) comprises (a-2-1) at least one monomer containing in one molecule at least one radical-polymerizable unsaturated double bond and having no reactive functional group other than the radical-polymerizable unsaturated double bond and (a-2-2) at least one monomer containing in one molecule at least one radical-polymerizable unsaturated double bond and at least one non-radical-polymerizable functional group together.

[9] The thermosetting resin composition for a powder paint according to any of [1] to [8] wherein the non-radical-polymerizable functional group of the component (a-2-2) is a glycidyl group.

[10] The thermosetting resin composition for a powder paint according to any of [1] to [9] wherein the amount of the component (a-2-2) is from 20 to 60 parts by weight based on 100 parts by weight of the total amount of the component (a-2-1) and the component (a-2-2).

[11] The thermosetting resin composition for a powder paint according to any of [1] to [10] wherein the component (a-2) has a glass transition temperature from 30 to 120° C.

[12] A thermosetting powder paint composition comprising a resin composition component (A) and a hardener composition component (B) wherein the above-described component (A) is the thermosetting resin composition for a powder paint of [1] to [10].

[13] The thermosetting powder paint composition according to [12] wherein the above-described component (B) is a hardener comprising (b-1) a polyvalent carboxylic acid, and/or (b-2) a polyvalent carboxylic anhydride.

[14] The thermosetting powder paint composition according to [12] or [13] wherein the polyvalent carboxylic acid constituting the component (b-1) is an aliphatic polyvalent carboxylic acid.

[15] The thermosetting powder paint composition according to any of [12] to [14] wherein the polyvalent carboxylic anhydride constituting the component (b-2) is an aliphatic polyvalent carboxylic anhydride.

[16] A thermosetting powder paint composition comprising a resin composition component (A) and a hardener composition component (B) wherein the above-described component (A) is a vinyl-based polymer obtained by allowing a vinyl-based polymer (component (a-1)) having a solubility parameter of 10.0 or less to graft-react with a vinyl-based polymer (component (a-2)) having a solubility parameter over the solubility parameter of the above-described component (a-1), the weight proportion of the above-described component (a-1) to the above-described component (a-2) is 0.01 to 10 parts by weight of the above-described component (a-1) based on 100 parts by weight of the above-described component (a-2), the above described components (a-1) comprises (a-1-1) a vinyl-based polymer containing in one molecule at least one radical-polymerizable unsaturated double bond and/or (a-1-2) a vinyl-based polymer containing in one molecule at least one non-radical-polymerizable functional group having reactivity with the above described component (a-2), the above described components (a-2) comprises (a-2-1) at least one monomer containing in one molecule at least one radical-polymerizable unsaturated double bond and having no reactive functional group other than the radical-polymerizable unsaturated double bond and (a-2-2) at least one monomer containing in one molecule at least one radical-polymerizable unsaturated double bond and at least one non-radical-polymerizable functional group having reactivity with the above described component(B) together, and the above-described component (B) is a hardener comprising (b-1) a polyvalent carboxylic acid, and/or (b-2) a polyvalent carboxylic anhydride.

[17] A thermosetting powder paint composition comprising a resin composition component (A) and a hardener composition component (B) wherein the above-described component (A) is a block copolymer comprising a S block and a G block, when the solubility parameters of the S block and the G block are represented by $SP_S$ and $SP_G$ respectively, $SP_S$ and $SP_G$ satisfy the following numerical formula (III) and the above-described numerical formula (I), when the weights of the S block and the G block are represented by $M_S$ and $M_G$ respectively, $M_S$ and $M_G$ satisfy the above-described numerical formula (II), the S block has a functional group having reactivity with the above-described component (B), and the above-described component (B) is a hardener comprising (b-1) a polyvalent carboxylic acid, and/or (b-2) a polyvalent carboxylic anhydride:

$$SP_G \leq 10 \tag{III}$$

[18] The thermosetting powder paint composition according to [17] wherein the block copolymer is a graft copolymer in which the S block is a back bone and the G block is a branch.

[19] The thermosetting powder paint composition according to [17] or [18] wherein the S block and/or the G block is a vinyl-based polymer.

[20] The thermosetting powder paint composition according to [17] or [18] wherein the S block and/or the G block is a (meth)acrylic vinyl polymer.

[21] A thermosetting powder paint composition comprising a resin composition component (A) and a hardener composition component (B) wherein the above-described component (A) is a block copolymer comprising a S block and a G block, when the solubility parameters of the S block and the G block are represented by $SP_S$ and $SP_G$ respectively, $SP_S$ and $SP_G$ satisfy the following numerical formula (IV) and the following numerical formula (V), when the weights of the S block and the G block are represented by $M_S$ and $M_G$ respectively, $M_S$ and $M_G$ satisfy the above-described numerical formula (II), the S block has a functional group having reactivity with the above-described component (B), and the above-described component (B) is a hardener comprising (b-1) a polyvalent carboxylic acid, and/or (b-2) a polyvalent carboxylic anhydride:

$$7 \leq SP_G \leq 10 \tag{IV}$$

$$SP_G \leq SP_S \leq 14 \tag{V}$$

According to the present invention, there can be provided a thermosetting powder paint composition (for example, an acrylic thermosetting powder paint composition) having excellent storage stabilities, appearance properties, physical properties and chemical properties, which have not been accomplished by the conventional technologies, and a thermosetting resin composition for a powder paint which is used in the thermosetting powder paint composition. Particularly, there can be provided a thermosetting powder paint composition (for example, an acrylic thermosetting powder paint composition) suitably applied to painting of bodies of vehicles such as automobiles and parts of vehicles such as automobiles (aluminum wheel, wiper, pillar, door handle, fender, bonnet, air spoiler, stabilizer, front grill and the like), particularly, to top painting.

DETAILED DESCRIPTION OF PREFERRED EMBODIMENTS

[Resin Composition Component (A)]

[Vinyl-based Polymer Used in Component (a-1)]

[Vinyl-based Polymer Used in Component (a-1-1)]

In the component (a-1), the component (a-1-1) is not particularly restricted providing it is a vinyl-based polymer containing in one molecule at least one radical-polymerizable unsaturated double bond and having a solubility parameter of 10.0 or less.

Preferably, a macromer having a polymerizable double bond in the end can be used.

More preferably, a (meth)acrylic macromer having a polymerizable double bond in the end can be used.

The component (a-1-1) exerts excellent effect by being grafted to the component (a-2). The method of this graft reaction is not particularly restricted.

[Macromer]

A macromer is a polymer having a molecular weight from several hundreds to dozens thousands which has a polymerizable reactive group at the end. The term macromer is originally a trade mark registered by PPG, however, it is a common noun now. The end is composed of a polymerizable functional group, and typical example thereof is a vinyl group. By using a macromer, a graft copolymer having clear structure can be obtained easily. Descriptions of a macromer are found in "Polymer Unabridged Dictionary", Polymer Society ed., published by ASAKURA Book Store, and the like.

[Graft Reaction]

A graft reaction is a reaction in which to a back bone polymer is bonded a branch polymer having different chemical structure from that of the back bone, to obtain a graft copolymer. Descriptions thereof are found in "Polymer Unabridged Dictionary", Polymer Society ed., published by ASAKURA Book Store, and the like.

[Use Amount of (a-1-1)]

The amount used of the component (a-1-1) is from 0.01 to 10 parts by weight, preferably from 0.1 to 5 parts by weight, further preferably from 0.5 to 2 parts by weight based on 100 parts by weight of the component (a-2) described later. When the use amount is less than 0.01, effect for reducing the surface tension is not fully exerted and cissing-resistance and appearance properties deteriorate. Further, effect to hydrophobitize a paint film also deteriorates leading to reduction of acid rain-resistance, and the effect thereof can not be fully exerted. When the use amount is over 10 parts by weight, decrease in crosslinking density of the paint film surface causes reductions of physical properties, chemical properties and the like.

[Solubility Parameter of (a-1)]

The solubility parameter is 10.0 or less, preferably 9.5 to less. Further preferably, it is 9.0 or less. When the solubility parameter is over 10.0, effect for reducing the surface tension is not fully exerted and cissing-resistance and appearance properties deteriorate. Further, effect to hydrophobitize a paint film also deteriorates leading to reduction of acid rain-resistance, and the effect thereof can not be fully exerted.

The solubility parameter is from 10.0 to 7.0, preferably from 9.5 to 7.0. Further preferably, it is from 9.0 to 7.0. When the solubility parameter is over 10.0, effect for reducing the surface tension is not fully exerted and cissing-resistance and appearance properties deteriorate. Further, effect to hydrophobitize a paint film also deteriorates leading to reduction of acid rain-resistance, and the effect thereof can not be fully exerted.

The (meth) acrylic macromer having a polymerizable double bond at the end has usually a solubility parameter in the range from 7.0 to 14.0.

[Method for Calculating Solubility Parameter]

In the present invention, the solubility parameter is determined by the Fedors method. This method is described in "Polymer Engineering and Science, vol. 14, February, pp. 147 to 154, 1974".

[Number-average Molecular Weight of (a-1-1)]

The number-average molecular weight is from 1000 to 20000, further preferably from 3000 to 10000. When the molecular weight is 1000 or less, physical properties, chemical properties and the like decrease, and also when 20000 or more, appearance properties deteriorate, and the effect thereof can not be fully exerted.

In the present invention, the number-average molecular weight can be evaluated by gel permeation chromatography (GPC) using polystyrene as a standard.

[Number of Radical-polymerizable Unsaturated Double Bond in (a-1-1)]

The number of the radical-polymerizable unsaturated double bond is one or more, and excellent effect thereof can be exerted by grafting with the component (a-2). Since problems such as gelation and the like occur when the number is too large, it is desirable to select suitable number at suitable moment.

[Typical Example of (a-1-1)]

The component (a-1-1) is not particularly restricted providing it contains in one molecule at least one radical-polymerizable unsaturated double bond and has a solubility parameter of 10.0 or less. Typical examples thereof include an acrylic macromer, AB-6, AW-6S (manufactured by Toagosei Co., Ltd.) and the like.

[Vinyl-based Polymer used in Component (a-1-2)]

In the component (a-1), the component (a-1-2) is not particularly restricted providing it is a vinyl-based polymer containing in one molecule at least one non-radical-polymerizable functional group having reactivity with the component (a-2) and having a solubility parameter of 10.0 or less.

The component (a-1-2) exerts excellent effect thereof by being grafted with the component (a-2). The grafting method is not particularly restricted.

[Use Amount of (a-1-2)]

The amount used of the component (a-1-2) is from 0.01 to 10 parts by weight, preferably from 0.1 to 5 parts by weight, further preferably from 0.5 to 2 parts. When the use amount is less than 0.01, effect for reducing the surface tension is not fully exerted and cissing-resistance and appearance properties deteriorate. Further, effect to hydrophobitize a paint film also deteriorates leading to reduction of acid rain-resistance, and the effect thereof can not be fully exerted. When the use amount is over 10 parts by weight, decrease in crosslinking density of the paint film surface causes reductions of physical properties, chemical properties and the like.

[Number-average Molecular Weight of (a-1-2)]

The number-average molecular weight is from 1000 to 20000, further preferably from 3000 to 10000. When the molecular weight is 1000 or less, physical properties, chemical properties and the like decrease, and the effect thereof can not be fully exerted. When it is over 20000, appearance properties deteriorate.

[Number of Non-radical-polymerizable Functional Group in (a-1-2)]

The number of the non-radical-polymerizable functional group is one or more, and excellent effect thereof can be exerted by grafting with the component (a-2). Since problems such as gelation and the like occur when the number is too large, it is desirable to select suitable number at suitable moment.

[Typical Example of (a-1-2)]

The component (a-1-2) is not particularly restricted providing it contains in one molecule at least one non-radical-polymerizable functional group having reactivity with the component (a-2) and has a solubility parameter of 10.0 or less, and a (meth)acrylic polymer can be preferably used. Examples of the monomer constituting the component (a-1-2) include acrylate or methacrylate monomers carrying an alkyl group or a cyclohexyl group having 1 to 14 carbon atoms; acrylic acid derivatives or methacrylic acid derivatives containing an acrylate or methacrylate of e.g. methyl-, ethyl-, n-propyl-, isoproppyl-, n-butyl-, isobutyl-, n-amyl-, isoamyl-, n-hexyl-, cyclohexyl-, 2-ethylhexyl-, octyl-, 2-ethyloctyl-, decyl-, dodecyl-, cyclohexyl- and the like; ethylenically unsaturated monomers like aromatic vinyls such as styrene, α-methylstyrene, vinyltoluene and the like, esters of a dicarboxylic acid such as maleic acid, itaconic acid and the like, halogenated ethylenically unsaturated monomers such as vinyl chloride, vinylidene chloride, vinyl fluoride, monochlorotrifluoroethylene, tetrafluoroethylene, chloroprene and the like, nitriles such as acrylonitrile, methacrylonitrile and the like, vinyl esters such as vinyl acetate, vinyl propionate and the like, α-olefins such as ethylene, propylene, isoprene, butadiene, α-olefins having 4 to 20 carbon atoms, and the like, alkyl vinyl ethers such as lauryl vinyl ether and the like; nitrogen-containing vinyls such as vinylpyrrolidone, 4-vinylpyrrolidone and the like, amides such as vinylamide, acrylamide, methacrylamide and the like, hydroxyl group-containing vinyl monomers such as hydroxyethyl methacrylate, 2-hydroxypropyl methacrylate and the like, glycidyl group-containing vinyl monomers such as glycidyl methacrylate, glycidyl acrylate, β-methylglycidyl methacrylate, β-methylglycidyl acrylate, acryl glycidyl ether and the like, carboxyl group-containing vinyl monomers such as acrylic acid, methacrylic acid and the like, amino group-containing vinyl monomers such as dimethylaminoethyl methacrylate, diethylaminoethyl mathacrylate and the like, and these may be used in admixture or combination.

[Derivative]

The term "derivative" used in the present invention includes those obtained by substitution of a hydrogen atom in a specific compound by other atom or atom group R. Wherein, R represents a monovalent hydrocarbon group containing at least one carbon atom. More specifically, may be an aliphatic group, an alicyclic group having substantially low aromatic degree, a group including combination thereof, or a divalent residual group obtained by bonding them via nitrogen, sulfur, silicon, phosphorus and the like, and among them, those having aliphatic structures in narrow definition are preferable. R may also be a group obtained by substitution with, e.g., an alkyl group, cycloalkyl group, allyl group, alkoxyl group, cycloalkoxyl group, allyloxy group, halogen group (F, Cl, Br or the like) and the like on the above-described groups. By suitably selecting these substituents, various properties of a paint film formed from a powder paint composition of the present invention can be controlled.

[Vinyl-based Polymer Used in Component (a-2)]
[Monomer Constituting (a-2-1)]

In the vinyl-based polymer (a-2), the monomer constituting the component (a-2-1) is not particularly restricted providing it is a monomer containing in one molecule at least one radical-polymerizable unsaturated double bond and having no reactive functional group other than the radical-polymerizable unsaturated double bond.

Specific examples of the vinyl monomer constituting the component (a-2-1) include acrylate or methacrylate monomers carrying an alkyl group or a cyclohexyl group having 1 to 14 carbon atoms; acrylic acid derivatives or methacrylic acid derivatives containing an acrylate or methacrylate of e.g. methyl-, ethyl-, n-propyl-, isoproppyl-, n-butyl-, isobutyl-, n-amyl-, isoamyl-, n-hexyl-, cyclohexyl-, 2-ethylhexyl-, octyl-, 2-ethyloctyl-, decyl-, dodecyl-, cyclohexyl- and the like; as well as other monomers, and these may be used in admixture or combination.

Other specific examples of the vinyl monomer constituting the component (a-2-1) include aromatic vinyls such as styrene, α-methylstyrene, vinyltoluene and the like, esters of a dicarboxylic acid such as maleic acid, itaconic acid and the like, halogenated ethylenically unsaturated monomers such as vinyl chloride, vinylidene chloride, vinyl fluoride, monochlorotrifluoroethylene, tetrafluoroethylene, chloroprene and the like, nitrites such as acrylonitrile, methacrylonitrile and the like, vinyl esters such as vinyl acetate, vinyl propionate and the like, α-olefins such as ethylene, propylene, isoprene, butadiene, α-olefins having 4 to 20 carbon atoms and the like, alkyl vinyl ethers such as lauryl vinyl ether and the like, nitrogen-containing vinyls such as vinylpyrrolidone, 4-vinylpyrrolidone and the like, as well as other monomers, and these may be used in admixture or combination.

It is believed that the component (a-2-l) contributes to improvement of the weather-resistance, adhesion to a substrate and hardness of the resultant paint film.

Further, generally in the component (a-2-1), also when aromatic vinyls such as styrene and the like or conjugated dienes such as butadiene and the like are used in large amount (for example, 40 wt % or more based on the total amount of (a-2)), there may be a tendency that the weather-resistance of the resultant paint film decreases, therefore, such use in large amount is not preferable. In the component (a-2-1), when nitrites such as acrylonitrile and the like are used in large amount, there may be a tendency that coloring of a paint film increases, leading to undesirable appearance.

[Monomer Constituting (a-2-2)]

In the vinyl-based polymer (a-2), the monomer constituting the component (a-2-2) is not particularly restricted providing it is at least one monomer containing in one molecule at least one radical-polymerizable unsaturated double bond and at least one non-radical-polymerizable reactive functional group together.

The "non-radical-polymerizable reactive functional group" is not particularly restricted, and examples thereof include a glycidyl group, epoxy group, hydroxyl group, amino group and the like, and a glycidyl group is preferable.

Specific examples of the ethylenically unsaturated monomer containing in the molecule at least one glycidyl group and at least one unsaturated double bond include glycidyl methacrylate, glycidyl acrylate, β-methylglycidyl methacrylate, β-methylglycidyl acrylate, acryl glycidyl ether and the like, and these may be used alone or in combination of two or more.

[Use Amount of (a-2-2)]

The amount used of the component (a-2-2) is from 20 to 60 wt %, preferably from 30 to 55 wt %, more preferably from 40 to 50 wt % based on the total amount of the component (a-2-1) and the component (a-2-2). When the use amount is less than 20 wt %, scratch-resistance, acid rain-resistance and the like deteriorate. On the other hand, when over 60%, sufficient melting time can not be obtained causing deterioration of appearance properties.

[Glass Transition Temperature]

The glass transition temperature of the component (a-2) is from 30 to 120° C., preferably from 40 to 110° C., further preferably from 50 to 100° C. in view of the storage stability of a powder paint composition, paint film smoothness ascribed to reduction in the flowability of the paint composition in baking the powder paint, and the like. When the glass transition temperature is less than 30° C., the storage stability deteriorates. On the other hand, when over 120° C., preferable melt viscosity is not obtained leasing to decrease deterioration of appearance properties.

[Glass Transition Temperature]

The glass transition temperature of a polymer having specific monomer composition can be calculated according to the Fox formula. The Fox formula is used for calculating the glass transition temperature of a copolymer based on glass transition temperatures of homopolymers of respective monomers forming the copolymer, and details thereof are described in Bulletin of the American Physical Society, Series 2, vol. 1, No. 3, p. 123–, (1956). Regarding the glass transition temperatures of ethylenically unsaturated monomers which are bases for evaluating the glass transition temperature of a copolymer according to the Fox formula, there can be adopted, for example, numerical values described in Novel Polymer Library (Shin Kobunshi Bunko), vol. 7, Guide of Synthetic Resin for Paint (Toryoyou Goseijushi Nyumon)(Kyozo Kitaoka ed., published by Polymer Publishing Institute (Kobunshi Kanko kai), Kyoto, 1974), pp. 168 to 169, table 10-2 (main raw material monomers of acrylic resins for a paint).

[Solubility Parameter of (a-2)]

The solubility parameter of the component (a-2) should be higher than that of the component (a-1). When the solubility parameter of the component (a-2) is lower than that of the component (a-1), the effect of the component (a-1) is disturbed leading to reduction in appearance properties, physical properties and chemical properties.

The solubility parameter of the component (a-2) is usually 14.0 or less.

[Number-average Molecular Weight of (a-2)]

The number-average molecular weight of the component (a-2) is in the range preferably from about 1000 to about 20000, further preferably from about 2000 to about 10000. When the number-average molecular weight is less than about 1000, storage stabilities, physical properties, chemical properties and the like decrease, and when over 20000, preferable melt viscosity is not obtained leading to deterioration of appearance properties.

For controlling the molecular weight of the vinyl-based copolymer (a-2), there can be used means such as polymerization in the presence of mercaptans such as dodecylmercaptan and the like, disulfides such as dibenzoylsulfide and the like, alkyl esters having 1 to 18 carbon atoms of thioglycolic acid such as 2-ethylhexyl thioglycolate and the like, chain transfer agents composed of halogenated hydrocarbons such as urea tetrabromide and the like, and organic solvents having chain transfer effect such as isopropyl alcohol, isopropylbenzene, toluene and the like, as well as other means.

[Method for Synthesizing (a-2)]

The method for synthesizing the component (a-2) is not particularly restricted provided that those having substantially desired properties are obtained, and a solution polymerization method is suitably used.

[Method for Grafting (a-1)]

[Method for Grafting (a-1-1)]

The method for grafting the component (a-1-1) is not particularly restricted, and specifically, there can be adopted the following method regarding an acrylic and/or methacrylic copolymer.

In usual solution polymerization:

① A solution prepared by dissolving the component (a-1-1) in a solution comprising an acrylic and/or methacrylic monomer and a polymerization initiator is dropped into an organic solvent solution at given temperature, for conducting a graft reaction.

② The component (a-1-1) is previously dissolved in an organic solvent solution, and an acrylic and/or methacrylic monomer and a polymerization initiator are dropped into the solution at given temperature, for conducting a graft reaction.

[Regarding Graft Reaction Method of (a-1-2)]

The method for grafting the component (a-1-2) is not particularly restricted, and specifically, there can be adopted the following method other than the above-described methods ① and ② for grafting the component (a-1-1) regarding an acrylic and/or methacrylic copolymer.

③ The components (a-1-2) and (a-2) are uniformly mixed in an organic solvent and the mixture is kept at given temperature, for conducting a graft reaction.

The organic solvents used in above-described methods ①, ② and ③ are not particularly restricted, and xylene, toluene and the like are preferably used.

[Hardener Component (B)]

In the present invention, the hardener component (B) comprises a polyvalent carboxylic acid-based hardener. The hardener (B) used in the thermosetting powder paint of the present invention is at least one compound selected from the group consisting of polyvalent carboxylic acids and/or polyvalent carboxylic anhydrides. This compound is a hardener component which reacts with an epoxy group (glycidyl group) present in the molecule of the resin composition for a powder paint of the present invention.

As the polyvalent carboxylic acid-based compound, any of aliphatic, aromatic and alicyclic compounds can be used. As specific examples of aromatic polyvalent carboxylic acid, there are listed, for example, isophthalic acid, trimellitic acid and the like, and these may be used alone or in combination. As specific examples of alicyclic polyvalent carboxylic acid, there are listed, for example, hexahydrophthalic acid, tetrahydrophthalic acid and the like, and these may be used alone or in combination. Polyester resins having a carboxyl group, and the like can also be used. In the present invention, use of an aliphatic polyvalent carboxylic acid-based compound is preferable from the standpoints of paint film properties such as smoothness, weather-resistance and the like.

The concept of the term "aliphatic" used in the specification of the instant application includes not only aliphatic compounds in a narrow meaning but also alicyclic compounds having substantially low aromatic degree. Namely, the concept of the term aliphatic compound includes the group consisting of compounds having substantially low aromatic degree and containing in the molecule a divalent hydrocarbon group having at least one carbon atom, and specifically, also includes not only aliphatic compounds in a narrow meaning but also alicyclic compounds having substantially low aromatic degree, groups including combination thereof, or the group consisting of compounds having in the molecule a divalent residual group obtained by bonding them via a hydroxyl group, nitrogen, sulfur, silicon, phosphorus and the like, and more specifically, also includes the group consisting of compounds having in the molecule a group obtained by substitution with, e.g., an alkyl group, cycloalkyl group, allyl group, alkoxyl group, cycloalkoxyl group, allyloxy group, halogen group (F, Cl, Br or the like) and the like on the above-described groups. By suitably selecting these substituents, various properties (heat-resistance, toughness, degradability, strength property and the like) of the copolymer of the present invention can be controlled. The concept of the term aliphatic compound used in the specification of the instant application includes not only one compound but also a combination of two or more.

Examples of this aliphatic polyvalent carboxylic acid-based compound will be described below.

[Aliphatic Polyvalent Carboxylic Acid-based Hardener Component (b-1)]

The aliphatic polyvalent carboxylic acid is not particularly restricted providing it is substantially an aliphatic compound containing in the molecule at least two carboxylic groups, and may be used alone or in combination.

As the specific example of the aliphatic polyvalent carboxylic acid (b-1), aliphatic dicarboxylic acids and the like are listed. Specific examples of the aliphatic dicarboxylic acid include succinic acid, glutaric acid, adipic acid, pimelic acid, suberic acid, azelaic acid, sebacic acid, citric acid, brassilic acid, undecanedioic acid, dodecanedioic acid, eicosanedioic acid, octadecanedioic acid and the like, and among them, dodecanedioic acid is preferable, and these may be used alone or in combination.

Regarding paint film properties such as smoothness, impact-resistance, weather-resistance and the like, when the aromatic degree of an alicyclic polyvalent carboxylic acid increases, the paint film properties deteriorate.

[Aliphatic Polyvalent Carboxylic Anhydride (b-2)]

The polyvalent carboxylic anhydride (b-2) in the present invention is not particularly restricted providing it is a linear oligo- or poly-aliphatic acid anhydride which is a dimer or higher multimer, containing in the molecule a carboxyl group or no carboxyl group and it is a compound having at least two carboxyl groups and/or acid anhydride groups substantially present in the molecule, and can be used alone or in combination.

A certain species of liner polycondensates obtained by dehydration-condensation of one kind of aliphatic polyvalent carboxylic acid, which can be used as the aliphatic polyvalent carboxylic anhydride (b-2), can be represented by the following general formula (1):

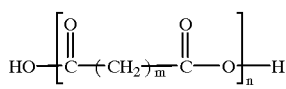

(1)

wherein, m represents a natural number of 1 or more and n represents a natural number of 2 or more, and preferably, m is 30 or less.

Dehydration-condensates of the aliphatic polyvalent carboxylic acid (b-1) are listed, and among them, dehydration-condensates of adipic acid, azelaic acid, sebacic acid, eicosanedioic acid, dodecanedioic acid and the like are listed, and a linear dehydration-condensate of dodecanedioic acid is further preferable. Typical examples thereof include Additol XVL1381 (manufactured by VIANOVALEDINE) and the like. The aliphatic polyvalent carboxylic anhydride (b-2) is preferably controlled so that the melting point is in the range from 40 to 150° C.

[Use Amount of Polyvalent Carboxylic Acid-based Hardener (B)]

The amount of a carboxyl group in the polyvalent carboxylic acid (B) is desirably from 0.3 to 1.2 equivalent, preferably from 0.5 to 1.1 equivalent, more preferably from 0.7 to 1.0 equivalent per one equivalent of a glycidyl group in the copolymer (a-2). Then the carboxyl group equivalent is less than 0.3, scratch-resistance, acid-resistance and the like deteriorate, and when over 1.2, appearance properties such as smoothness, sharpness and the like deteriorate.

[Additive]

In the method of the present invention, various additives usually added to a paint are added.

In the thermosetting powder paint composition of the present invention, appearance or physical properties of a paint film can be improved by appropriately compounding a synthetic resin composition comprising an epoxy resin, polyester resin, polyamide and the like, or a natural resin or semi-synthetic resin composition comprising fibrin, fibrin derivative or the like, according to the intention.

In the thermosetting powder paint composition of the present invention, additives such as a hardening catalyst, pigment, flow controlling agent, thixotropy controlling agent, charge controlling agent, surface controlling agent, brightener, blocking preventing agent, plasticizer, ultraviolet ray absorber, boil preventing agent, antioxidant and the like may be appropriately compounded, according to the intention. When used as a clear coat, a small amount of a pigment may also be compounded for coloring to an extent wherein masking property is not exhibited completely.

[Regarding Kneading of Powder Paint Composition]

The temperature of a material to be kneaded in mechanically kneading a composition containing (A) and (B) is not particularly restricted provided that a substantially uniform powder paint composition can be prepared. As the melt kneading apparatus, a heat roll, heat kneader, extruder and the like are usually used.

Specific examples of the method for compounding the thermosetting powder paint composition of the present invention may include, but are not limited to, methods in which kneading machines and blending machines such as rolls, kneaders, mixers (Banbury type, transfer type and the like), calender apparatuses, extruders and the like are appropriately combined, conditions for each process (temperature, melting or non-melting, revolution, vacuum atmosphere, inert gas atmosphere and the like) are appropriately set, materials are mixed uniformly, then, a uniform powder paint composition in the form of a fine powder is obtained by a grinding apparatus.

[Regarding Grinding of Powder Paint Composition]

A massive paint obtained by kneading is cooled before being ground to obtain an average particle size of about 10 to 90 $\mu$m. As the grinding apparatus used, a hammer mill and the like are listed.

[Painting Method and Baking Method]

A powder of thermosetting powder paint composition obtained by grinding is allowed to adhere to a painting subject by a painting method such as an electrostatic painting method, flow immersion method and the like, and heated to thermoset to form a paint film. The thermosetting powder paint composition of the present invention can be usually baked at a temperature from about 100° C. to about 180° C., preferably from about 120° C. to about 160° C., for usually about 10 minutes to about 60 minutes, to conduct the crosslinking reaction of the resin composition (A) with the hardener (B). After baking, the composition is cooled to room temperature to obtain a paint film having excellent properties.

When the thermosetting powder paint composition of the present invention is used as a top coat paint, even if not only a conventional solvent type paint but also an aqueous paint is used as a primer paint thereof, a paint film obtained by baking the paint of the present invention shows excellent properties like the case wherein a solvent type paint is used.

Namely, an aqueous primer paint (including pigment-containing paint and/or metal powder-containing paint) is painted, dried to given time, then, the thermosetting powder paint composition of the present invention is allowed to adhere onto the primer paint by the above-described method, and heated to thermoset to form a paint film.

The method for painting the thermosetting powder paint composition of the present invention can also be applied to bodies or parts (aluminum wheel, wiper, center pillar and the like) of automobiles.

A paint film formed by a suitable or public-known and used painting method using the thermosetting powder paint composition of the present invention has excellent storage stabilities (blocking-resistance and the like), appearance properties (cissing, smoothness, sharpness and the like), physical properties (hardness, scratch-resistance and the like) and chemical properties (weather-resistance, acid-resistance, solvent-resistance and the like.

EXAMPLE

In the specification of the instant application, production examples, examples and embodiments are used for helping understanding of the content of the invention according to the instant application and descriptions thereof do not limit the scope of the present invention at all.

In the descriptions, "parts" and "%" are by weight unless otherwise stated.

[Preparation of Painting Plate]

A black paint containing polyester-melamine crosslinking was painted to obtain a thickness of 20 $\mu$m on a 0.8 mm thick bonderizing steel plate on which zinc phosphating treatment had been performed, then, the paint was baked at 170° C. for 30 minutes, to prepared a primer-treated steel plate.

[Ability Evaluation]

Ability evaluations were conducted as follows. (I) Blocking test of powder paint A cylindrical vessel having an internal diameter of 20 mm was charged with 6.0 g of a powder paint, and after storage at 30° C. for 7 days, the powder was removed, and blocking condition of the powder paint was checked by visual observation and finger touch, and evaluated by ⊚ to x.

⊚ No defect at all
○ somewhat inferior
× inferior

② Visual Appearance (Smoothness, Sharpness)

Appearances of a paint film were observed visually and evaluated by ⊚ to ×.

⊚ extremely excellent
○ excellent
× inferior

③ Gloss

It was shown by measured value (60° gloss) by a glossimeter.

④ Cissing-resistance

Cissing of a paint film was visually observed and evaluated by ○, ×.

○ cissing recognized
× no cissing

⑤ Paint Film Hardness Test

Its was evaluated by the pencil scratch test (according to JIS K 5400 6.14). Mark was represented by pencil hardness.

⑥ Scratch Resistance

A scratch test was conducted in which the surface of a paint film was rubbed with a brush using a 3% abrasive suspension, and gloss (20° gloss) was evaluated before and after the rubbing, and gloss retention was calculated. The gloss retention was evaluated by ⊚, ○ and ×.

⊚ 60% or more
○ 40% or more and less than 60%
× less than 40%

⑦ Acid-resistance Test

A 10 vol % sulfuric acid solution was dropped on the surface of a paint film, and left for 1 day at room temperature. Then, the sulfuric acid drop was wiped off, and appearance was observed and evaluated by ⊚, ○ and ×.

⊚ no imprint
○ extremely slight imprint
× imprint recognized

⑧ Solvent-resistance

The surface of a paint film was rubbed back and forth 50 times with a gauze impregnated with xylene, and the paint film was observed and evaluated by ⊚, ○ and ×.

⊚ no imprint
○ extremely slight imprint
× imprint recognized

⑧ Weather-resistance Test

A promotion test was conducted by a QUV tester for 2000 hours, and glossiness of a paint film before and after the promotion test was measured, and the gloss remaining rate (%) was obtained. The gloss remaining rate was calculated according to the numerical formula (VI).

$$\text{Gloss remaining rate }[\%] = \frac{60° \text{ glossiness after promotion test}}{60° \text{ glossiness before promotion test}} \times 100 \quad \text{(VI)}$$

Production Examples 1,2 of Vinyl-based Polymer (a-1-2)

A four-necked flask equipped with a stirrer, thermometer, reflux condenser and nitrogen inlet tube was charged with 66.7 parts of xylene and was heated to the reflux temperature. Into monomers shown in Table 1 were dissolved 1.0 part of N,N'-azobisisobutyronitrile as a polymerization initiator, and the mixed solutions were dropped over 5 hours, then, the mixtures were kept at 100° C. for 5 hours. By removing solvents from the resultant polymerization solutions, vinyl-based copolymers were obtained (Production Examples 1, 2). Physical properties of the resulted copolymers were described together in Table 1.

Comparative Production Example of Vinyl-based Polymer (a-1-2)

Monomer compositions shown in Table 2 were subjected to the same procedure as in the above-described production example of (a-1-2) to obtain vinyl-based copolymers (Comparative Production Examples 1, 2, 3). Physical properties of the resulted copolymers were described together in Table 2.

Production Examples 1, 2 of Vinyl-based Polymer (A)

A four-necked flask equipped with a stirrer, thermometer, reflux condenser and nitrogen inlet tube was charged with 66.7 parts of xylene and was heated to the reflux temperature. Into monomers and the component (a-1-l)(AW-6S and AB-6) shown in Table 3 were dissolved 3.5 part of N,N'-azobisisobutyronitrile as a polymerization initiator, and the mixed solutions were dropped over 5 hours, then, the mixtures were kept at 100° C. for 5 hours. By removing solvents from the resultant polymerization solutions, vinyl-based copolymers were obtained (Production Examples 1, 2). Physical properties of the resulted copolymers are described together in Table 3.

Production Examples 3, 4, 5, 6, 7, 8 of Vinyl-based Polymer (A)

A four-necked flask equipped with a stirrer, thermometer, reflux condenser and nitrogen inlet tube was charged with 66.7 parts of xylene and was heated to the reflux temperature. Into monomers shown in Table 3 were dissolved 3.5 part of N,N'-azobisisobutyronitrile as a polymerization initiator, and the mixed solutions were dropped over 5 hours, then, the mixtures were kept at 100° C. for 5 hours. By adding the component (a-1-2) shown in Table 3 to the resultant polymerization solution and removing solvents from the solutions, vinyl-based copolymers were obtained (Production Examples 3, 4, 5, 6, 7, 8). Physical properties of the resulted copolymers are described together in Table 3.

Comparative Production Example 1 of Vinyl-based Polymer (A)

A four-necked flask equipped with a stirrer, thermometer, reflux condenser and nitrogen inlet tube was charged with 66.7 parts of xylene and was heated to the reflux temperature. Into a monomer and the component (a-1-l)(AA-6) shown in Table 4 was dissolved 3.5 part of N,N'-azobisisobutyronitrile as a polymerization initiator, and the mixed solution was dropped over 5 hours, then, the mixture was kept at 100° C. for 5 hours. By removing a solvent from the polymerization solution, a vinyl-based copolymer was obtained (Comparative Production Example 1). Physical properties of the resulted copolymer are described together in Table 4.

Comparative Production Examples 2, 3, 4, 5, 6, 7, 8, 9 of Vinyl-based Polymer (A)

A four-necked flask equipped with a stirrer, thermometer, reflux condenser and nitrogen inlet tube was charged with 66.7 parts of xylene and was heated to the reflux temperature. Into a monomer shown in Table 4 was dissolved 3.5 part of N,N'-azobisisobutyronitrile as a polymerization initiator, and the mixed solution was dropped over 5 hours, then, the mixture was kept at 100° C. for 5 hours. By adding the products of Production Example 1 of the component (a-1-2) and Comparative Production Examples 1, 2, 3 of the component (a-1-2) shown in Table 4 to the resultant polymerization solution and removing solvents from the polymerization solutions, vinyl-based copolymers were obtained (Comparative Production Examples 2, 3, 4, 5, 6, 7, 8, 9). Physical properties of the resulted copolymers are described together in Table 4.

Examples 1, 2, 3, 4, 5, 6, 7, 8

Acrylic copolymers (A) (Production Examples 1, 2, 3, 4, 5, 6, 7, 8) and the component (B) were compounded in proportions (parts) shown in Table 5, each 1 part of Tinuvin 144 (manufactured by Ciba Geigy, light stabilizer) and Benzoin (boil preventing agent) and 2 parts of Tinuvin 900 (manufactured by Ciba Geigy, ultraviolet ray absorber) were added based on 100 parts by weight of the total amount of (A) and (B), the mixtures were melted and kneaded under the condition of 90° C. by a heat roll, and cooled, then, finely ground by a grinder, and fractions passed through a 150 mesh sieve were collected to obtain powder paints. The resulted powder paints were painted on primer-treated steel plates by an electrostatic spray to obtain a thickness of 60 to 70 $\mu$m, then, heated at 150° C. for 30 minutes to obtain test plates.

Example 9

A test plate was obtained in the same manner as in Example 1 except that 72 parts of the acrylic copolymer (A) produced in Production Example 1, 28.0 parts of Additol VXL1381 (manufactured by Hechst), a commercially available aliphatic polyacid anhydride hardener as a polyvalent carboxylic acid-based hardener (B), and 0.2 parts of tin octoate (Neostan U-28, manufactured by Nitto Kasei Co., Ltd.) as a hardening catalyst were used.

Comparative Examples 1 to 6, 9, 10

Test plates were obtained in the same manner as in Example 1 except that the acrylic copolymers (Comparative Production Examples 1 to 6 and 8 to 9 of (A)) and the component (B) were compounded in proportions (parts) shown in table 6.

Comparative Examples 7, 8

Test plates were obtained in the same manner as in Example 1 except that 79.3 parts of the acrylic copolymer produced in Comparative Production Example 7 of (A), 20.7 parts of dodecanedioic acid, and 1.0 part of the products of Comparative Production Example 3 of the component (a-1-2) or Production Example 2 of the component (a-1-2) were used.

Evaluation Results of Examples and Comparative Examples

Results of evaluation of the powder paints and paint films formed in Examples 1 to 9 are shown in Table 7. Further, results of evaluation of the powder paints and paint films formed in Comparative Examples 1 to 10 correlating to them are shown in Table 8. The powder paint compositions of Examples 1 to 8 shown in Table 7 satisfy the numerical ranges according to the present invention, and these results show that the present invention provides a thermosetting powder paint composition which can give a paint film having excellent storage stabilites (blocking property and the like), appearance properties (cissing, smoothness, sharpness and the like), physical properties (hardness, scratch-resistance and the like) and chemical properties (weather-resistance, acid-resistance, solvent-resistance and the like).

In Comparative Examples 1, 2, 3, the solubility parameter of the component (a-1) was over 10, and cissing-resistance, acid-resistance and the like were poor.

In Comparative Examples 4, 5, the use amount of the component (a-1) was out of the range defined in claims, and when this amount was less than the range defined in claims, appearances, cissing-resistance and acid-resistance were poor. On the other hand, when this amount was over than the range defined in claims, acid-resistance and the like were poor.

In Comparative Examples 6, 7, 8, the component (a-1) was not grafted to the component (a-2), and blocking property, cissing-resistance and the like were poor.

In Comparative Examples 9, 10, the use amount of the component (a-2-2) was out of the range defined in claims, and in this case, when this amount was less than the range defined in claims, scratch-resistance and solvent-resistance were poor. On the other hand, when this amount was over than the range defined in claims, appearance was poor.

The evaluation results of Examples 1 to 9 are shown in Table 7.

The evaluation results of Comparative Examples 1 to 10 are shown in Table 8.

TABLE 1

Production Examples 1, 2 of (a-1-2)

| | | Production Example 1 | Production Example 2 |
|---|---|---|---|
| Monomer composition (part) | Isobutyl acrylate | — | 95 |
| | Isobutyl methacrylate | 95 | — |
| | Ethyl acrylate | — | — |
| | Methacrylic acid | 5 | 5 |
| Solubility parameter | | 8.7 | 9.6 |
| Number-average molecular weight (Mn) | | 6500 | 3000 |

TABLE 2

Comparative Examples 1, 2, 3 of (a-1-2)

| | | Comparative Production Example 1 | Comparative Production Example 2 | Comparative Production Example 3 |
|---|---|---|---|---|
| Monomer composition (part) | Isobutyl acrylate | 57 | 40 | 100 |
| | Isobutyl methacrylate | — | — | — |
| | Ethyl acrylate | 38 | 55 | — |
| | Methacrylic acid | 5 | 5 | — |
| Solubility parameter | | 10.1 | 10.3 | 9.6 |
| Number-average molecular weight (Mn) | | 3000 | 3000 | 3000 |

TABLE 3

Production Examples 1 to 8 of (A)

|  |  | Production Example 1 | Production Example 2 | Production Example 3 | Production Example 4 | Production Example 5 | Production Example 6 | Production Example 7 | Production Example 8 |
|---|---|---|---|---|---|---|---|---|---|
| (a-2-1) (part) | Styrene | 15.0 | 15.0 | 15.0 | 15.0 | 15.0 | 15.0 | 15.0 | 15.0 |
|  | Methyl methacrylate | 40.0 | 40.0 | 40.0 | 40.0 | 40.0 | 40.0 | 40.0 | 25.0 |
|  | n-Butyl methacrylate | 5.0 | 5.0 | 5.0 | 5.0 | 5.0 | 5.0 | 25.0 | — |
| (a-2-2) (part) | Glycidyl methacrylate | 40.0 | 40.0 | 40.0 | 40.0 | 40.0 | 40.0 | 20.0 | 60.0 |
| (a-1) (part) | AW-6S ※1 | 2.0 |  |  |  |  |  |  |  |
|  | AB-6 ※2 |  | 1.0 |  |  |  |  |  |  |
|  | Production Example 1 of (a-1-2) |  |  | 1.0 |  | 0.01 | 10.0 | 1.0 | 1.0 |
|  | Production Example 2 of (a-1-2) |  |  |  | 1.0 |  |  |  |  |
| Solubility parameter of (a-2) |  | 10.2 | 10.2 | 10.2 | 10.2 | 10.2 | 10.2 | 10.2 | 9.9 |
| Glass transition temperature of (a-2) (° C.) |  | 74 | 74 | 74 | 74 | 74 | 74 | 67 | 67 |
| Epoxy equivalent of (A) (g/eq) ※3 |  | 375 | 375 | 375 | 375 | 375 | 425 | 750 | 250 |
| Number-average molecular weight of (A) (Mn) |  | 3000 | 3000 | 3000 | 3000 | 3000 | 3500 | 3000 | 3000 |

※1: Macromer manufactured by Toagosei Co., Ltd., solubility parameter = 8.5
※2: Macromer manufactured by Toagosei Co., Ltd., solubility parameter = 9.9
※3: Epoxy equivalent; determined by perchloric acid titration method

TABLE 4

Comparative Production Examples 1 to 9 of (A)

|  |  | Comparative Production Example 1 | Comparative Production Example 2 | Comparative Production Example 3 | Comparative Production Example 4 | Comparative Production Example 5 |
|---|---|---|---|---|---|---|
| (a-2-1) (part) | Styrene | 15.0 | 15.0 | 15.0 | 15.0 | 15.0 |
|  | Methyl methacrylate | 40.0 | 40.0 | 40.0 | 40.0 | 40.0 |
|  | n-Butyl methacrylate | 5.0 | 5.0 | 5.0 | 5.0 | 5.0 |
| (a-2-2) | Glycidyl methacrylate | 40.0 | 40.0 | 40.0 | 40.0 | 40.0 |
| (a-1) and Comparative Production Examples of (a-1) (part) | AA-6 ※4 | 1.0 |  |  |  |  |
|  | Production Example of (a-1-2) |  |  |  | 0.001 | 20.0 |
|  | Comparative Production Example 1 of (a-1-2) |  | 1.0 |  |  |  |
|  | Comparative Production Example 2 of (a-1-2) |  |  | 1.0 |  |  |
|  | Comparative Production Example 3 of (a-1-2) |  |  |  |  |  |
| Solubility parameter of (a-2) |  | 10.2 | 10.2 | 10.2 | 10.2 | 10.2 |
| Glass transition temperature of (a-2) (° C.) |  | 74 | 74 | 74 | 74 | 74 |
| Epoxy equivalent of (A) (g/eq) |  | 375 | 375 | 375 | 375 | 500 |
| Number-average molecular weight of (A) (Mn) |  | 3000 | 3000 | 3000 | 3000 | 4000 |

|  |  | Comparative Production Example 6 | Comparative Production Example 7 | Comparative Production Example 8 | Comparative Production Example 9 |
|---|---|---|---|---|---|
| (a-2-1) (part) | Styrene | 15.0 | 15.0 | 15.0 | 15.0 |
|  | Methyl methacrylate | 40.0 | 40.0 | 40.0 | 15.0 |
|  | n-Butyl methacrylate | 5.0 | 5.0 | 35.0 | — |
| (a-2-2) | Glycidyl methacrylate | 40.0 | 40.0 | 10.0 | 70.0 |
| (a-1) and Comparative Production Examples of (a-1) (part) | AA-6 ※4 |  |  |  |  |
|  | Production Example of (a-1-2) |  |  | 1.0 | 1.0 |
|  | Comparative Production Example 1 of (a-1-2) |  |  |  |  |
|  | Comparative Production Example 2 of (a-1-2) |  |  |  |  |
|  | Comparative Production Example 3 of (a-1-2) | 1.0 |  |  |  |
| Solubility parameter of (a-2) |  | 10.2 | 10.2 | 10.2 | 9.7 |
| Glass transition temperature of (a-2) (° C.) |  | 74 | 74 | 64 | 61 |
| Epoxy equivalent of (A) (g/eq) |  | 375 | 375 | 1500 | 210 |
| Number-average molecular weight of (A) (Mn) |  | 3000 | 3000 | 3000 | 3000 |

※4: Macromer manufactured by Toagosei Co., Ltd., solubility parameter = 11.3

TABLE 5

Paint composition in Examples 1 to 9

| Examples | (Meth)acrylic copolymer component (A) | Polyvalent carboxylic acid-based hardener component (B) | Tin octoate (hardener catalyst) |
|---|---|---|---|
| 1 | Production Example 1 79.3 | Dodecanedioic acid 20.7 | — |
| 2 | Production Example 2 79.3 | Dodecanedioic acid 20.7 | — |
| 3 | Production Example 3 79.3 | Dodecanedioic acid 20.7 | — |
| 4 | Production Example 4 79.3 | Dodecanedioic acid 20.7 | — |
| 5 | Production Example 5 79.3 | Dodecanedioic acid 20.7 | — |
| 6 | Production Example 6 81.3 | Dodecanedioic acid 18.7 | — |
| 7 | Production Example 7 88.5 | Dodecanedioic acid 11.5 | — |
| 8 | Production Example 8 71.9 | Dodecanedioic acid 28.1 | — |
| 9 | Production Example 1 72.0 | Additol XVL 1381 28.0 | Neostan U-28 0.2 |

TABLE 6

Paint composition in Comparative Examples 1 to 10

| Comparative Examples | Comparative Production Example (A) | Polyvalent carboxylic acid-based hardener component (B) | (Comparative) Production Example of (a-1-2) |
|---|---|---|---|
| 1 | Comparative Production Example 1 79.3 | Dodecanedioic acid 20.7 | |
| 2 | Comparative Production Example 2 79.3 | Dodecanedioic acid 20.7 | |
| 3 | Comparative Production Example 3 79.3 | Dodecanedioic acid 20.7 | |
| 4 | Comparative Production Example 4 79.3 | Dodecanedioic acid 20.7 | |
| 5 | Comparative Production Example 5 83.6 | Dodecanedioic acid 16.4 | |
| 6 | Comparative Production Example 6 79.3 | Dodecanedioic acid 20.7 | |
| 7 | Comparative Production Example 7 79.3 | Dodecanedioic acid 20.7 | Comparative Production Example 3 of (a-1-2) 1.0 |
| 8 | Comparative Production Example 7 79.3 | Dodecanedioic acid 20.7 | Production Example 2 of (a-1-2) 1.0 |
| 9 | Comparative Production Example 8 93.9 | Dodecanedioic acid 6.1 | |
| 10 | Comparative Production Example 9 68.2 | Dodecanedioic acid 31.8 | |

TABLE 7

Evaluation result in Examples

| | Example 1 | 2 | 3 | 4 | 5 | 6 | 7 | 8 | 9 |
|---|---|---|---|---|---|---|---|---|---|
| Blocking property | ⊚ | ○ | ⊚ | ○ | ⊚ | ⊚ | ⊚ | ⊚ | ⊚ |
| Appearance | ⊚ | ⊚ | ⊚ | ⊚ | ⊚ | ⊚ | ⊚ | ○ | ⊚ |
| Gloss (60° gloss) | 92 | 92 | 92 | 92 | 92 | 92 | 92 | 92 | 92 |
| Cissing-resistance | ○ | ○ | ○ | ○ | ○ | ○ | ○ | ○ | ○ |
| Paint film hardness | H | H | H | H | H | H | H | H | H |
| Scratch-resistance | ⊚ | ⊚ | ⊚ | ⊚ | ⊚ | ○ | ○ | ⊚ | ⊚ |
| Acid-resistance test | ⊚ | ○ | ⊚ | ○ | ⊚ | ○ | ○ | ⊚ | ⊚ |
| Solvent-resistance | ⊚ | ⊚ | ⊚ | ⊚ | ⊚ | ○ | ○ | ⊚ | ⊚ |
| Weather-resistance Gloss retention rate (%) | 94 | 92 | 93 | 93 | 92 | 92 | 92 | 93 | 94 |

TABLE 8

Evaluation result of Comparative Examples

| | Comparative Example 1 | 2 | 3 | 4 | 5 | 6 | 7 | 8 | 9 | 10 |
|---|---|---|---|---|---|---|---|---|---|---|
| Blocking property | ⊚ | ○ | ○ | ⊚ | ⊚ | x | x | x | ⊚ | ⊚ |
| Appearance | x | ○ | x | x | ⊚ | ○ | ○ | ○ | ⊚ | x |
| Gloss (60° gloss) | 92 | 92 | 92 | 92 | 92 | 92 | 92 | 92 | 92 | 92 |
| Cissing-resistance | x | x | x | ○ | x | x | x | x | ○ | ○ |
| Paint film hardness | H | H | H | H | F | H | H | H | H | H |
| Scratch-resistance | ○ | ○ | ○ | ○ | x | x | x | ○ | x | ⊚ |
| Acid-resistance test | x | x | x | x | x | ○ | ○ | ○ | ○ | ⊚ |
| Solvent-resistance | ⊚ | ⊚ | ⊚ | ⊚ | x | ○ | ○ | ⊚ | x | ⊚ |
| Weather-resistance Gloss retention rate (%) | 93 | 92 | 93 | 93 | 92 | 92 | 92 | 93 | 92 | 93 |

What is claimed is:

1. A thermosetting resin composition for a powder paint in which a resin composition component (A) is a (block) copolymer obtained by allowing a vinyl-based polymer G (branch) block (component (a-1)) to graft-react with a vinyl-based polymer S (back bone) block (component (a-2)), and when the solubility parameters of the components (a-1) and (a-2) are represented by $SP_G$ and $SP_S$, respectively, $SP_G$ and $SP_S$ satisfy the following numerical formulae (I) and (III):

$$SP_G < SP_S \quad (I)$$

$$SP_G \leq 10 \tag{III}$$

and when the weights of said components (a-1) and (a-2) are represented by $M_G$ and $M_S$, respectively, $M_G$ and $M_S$ satisfy the following numerical formula (II):

$$M_S \times 10^{-4} \leq M_G \leq M_S \times 10^{-1} \tag{II}$$

and said component (a-2) comprises (a-2-1) at least one monomer containing in one molecule at least one radical-polymerizable unsaturated double bond and having no reactive functional group other than the radical-polymerizable unsaturated double bond and (a-2-2) at least one monomer containing in one molecule at least one radical-polymerizable unsaturated double bond and at least one non-radical-polymerizable functional group together, and the amount of component (a-2-2) is from 20 to 60 parts by weight based on 100 parts by weight of the total amount of the component (a-2-1) and the component (a-2-2).

2. The thermosetting resin composition for a powder paint according to claim 1 wherein the vinyl-based polymer of the component (a-1) and/or the vinyl-based polymer of the component (a-2) comprises a (meth)acrylic vinyl polymer.

3. The thermosetting resin composition for a powder paint according to claim 1 wherein the vinyl-based polymer of the component (a-1) and/or the vinyl-based polymer of the component (a-2) is composed solely of a (meth)acrylic vinyl polymer.

4. The thermosetting resin composition for a powder paint according to claim 1 wherein said component (a-1) comprises (a-1-1) a vinyl-based polymer containing in one molecule at least one radical-polymerizable unsaturated double bond and/or (a-1-2) a vinyl-based polymer containing in one molecule at least one non-radical-polymerizable functional group having reactivity with said component (a-2).

5. The thermosetting resin composition for a powder paint according to claim 4 wherein the non-radical-polymerizable functional group of the component (a-1-2) is at least one group selected from a carboxyl group, acid anhydride group and amino group.

6. The thermosetting resin composition for a powder paint according to claim 1 wherein the non-radical-polymerizable functional group of the component (a-2-2) is a glycidyl group.

7. The thermosetting resin composition for a powder paint according to claim 1 wherein the component (a-2) has a glass transition temperature from 30 to 120° C.

8. A thermosetting powder paint composition comprising a resin composition component (A) and a hardener composition component (B) wherein said component (A) is the thermosetting resin composition for a powder paint of claim 1.

9. The thermosetting powder paint composition according to claim 8 wherein said component (B) is a hardener comprising (b-1) a polyvalent carboxylic acid, and/or (b-2) a polyvalent carboxylic anhydride.

10. The thermosetting powder paint composition according to claim 9 wherein the polyvalent carboxylic acid constituting the component (b-1) is an aliphatic polyvalent carboxylic acid.

11. The thermosetting powder paint composition according to claim 9 wherein the polyvalent carboxylic anhydride constituting the component (b-2) is an aliphatic polyvalent carboxylic anhydride.

12. The thermosetting resin composition for a powder paint according to claim 2 wherein the component (a-2) has a glass transition temperature from 30 to 120° C.

13. The thermosetting resin composition for a powder paint according to claim 3 wherein the component (a-2) has a glass transition temperature from 30 to 120° C.

\* \* \* \* \*

UNITED STATES PATENT AND TRADEMARK OFFICE
CERTIFICATE OF CORRECTION

PATENT NO.      : 6,333,380 B1
DATED           : December 25, 2001
INVENTOR(S)     : Hiroyuki Sakayama et al.

It is certified that error appears in the above-identified patent and that said Letters Patent is hereby corrected as shown below:

<u>Column 22,</u>
Line 66, change Formula I to read:
-- $Sp_g < SP_s$      (I) --

Signed and Sealed this

Twenty-ninth Day of October, 2002

Attest:

Attesting Officer

JAMES E. ROGAN
Director of the United States Patent and Trademark Office